(12) United States Patent
Wilkinson

(10) Patent No.: US 8,120,297 B2
(45) Date of Patent: Feb. 21, 2012

(54) CONTROL OF SYNCHRONOUS ELECTRICAL MACHINES

(75) Inventor: Jamie Jon Aorangi Wilkinson, Auckland (NZ)

(73) Assignee: Wellington Drive Technologies Limited (NZ)

( * ) Notice: Subject to any disclaimer, the term of this patent is extended or adjusted under 35 U.S.C. 154(b) by 354 days.

(21) Appl. No.: 12/439,946

(22) PCT Filed: Sep. 3, 2007

(86) PCT No.: PCT/NZ2007/000245
§ 371 (c)(1),
(2), (4) Date: May 29, 2009

(87) PCT Pub. No.: WO2008/030109
PCT Pub. Date: Mar. 13, 2008

(65) Prior Publication Data
US 2010/0207557 A1    Aug. 19, 2010

(51) Int. Cl.
H02P 7/00    (2006.01)
H02K 7/00    (2006.01)

(52) U.S. Cl. .................. 318/400.15; 318/724; 310/67 R; 310/177

(58) Field of Classification Search .......... 318/400.15, 318/724; 310/67 R, 177
See application file for complete search history.

(56) References Cited

U.S. PATENT DOCUMENTS

| 3,529,221 | A | | 9/1970 | Reinke | |
|---|---|---|---|---|---|
| 4,598,240 | A | | 7/1986 | Gale et al. | |
| 4,695,782 | A | | 9/1987 | Jatnieks | |
| 4,716,325 | A | | 12/1987 | Roos | |
| 5,708,333 | A | * | 1/1998 | Kirn | 318/246 |
| 5,859,513 | A | | 1/1999 | Stephens et al. | |
| 6,249,103 | B1 | | 6/2001 | Alvaro et al. | |
| 2006/0071577 | A1 | * | 4/2006 | Takeuchi | 310/268 |
| 2009/0033169 | A1 | * | 2/2009 | Takeuchi | 310/156.32 |
| 2010/0033064 | A1 | * | 2/2010 | Tanaka et al. | 310/67 R |
| 2010/0289387 | A1 | * | 11/2010 | Tanaka et al. | 310/68 B |
| 2011/0155085 | A1 | * | 6/2011 | Hirano et al. | 123/179.3 |

FOREIGN PATENT DOCUMENTS

| DE | 3609793 A1 | 9/1987 |
|---|---|---|
| EP | 0945973 A2 | 9/1999 |
| EP | 0991178 | 5/2000 |
| EP | 1211787 | 5/2002 |
| JP | 62171449 A | 7/1987 |

OTHER PUBLICATIONS

International Search Report for PCT/NZ2007/000245 dated May 8, 2008.
Supplementary European Search Report for EP07834849.7, PCT/NZ2007/000245, Date of Completion of Search Jul. 1, 2010, 6 Pages.

* cited by examiner

*Primary Examiner* — Thomas Dougherty
(74) *Attorney, Agent, or Firm* — Brooks Kushman P.C.

(57) ABSTRACT

A synchronous motor having phase windings which are split or tapped and in which the conduction angle of the applied alternating current is varied at one or more taps to allow the motor to start in a controlled direction and be torque controlled to synchronous speed.

11 Claims, 5 Drawing Sheets

CONTROL OF SYNCHRONOUS ELECTRICAL MACHINES

TECHNICAL FIELD

The invention generally relates to alternating current driven synchronous motors.

More particularly the invention relates to controlling alternating, current (AC) driven synchronous motors.

BACKGROUND ART

A synchronous motor may be defined as either a motor which has a running speed which is exactly proportional to an AC supply frequency or as a motor which is driven by waves of current synchronous with the motor back EMF. This latter definition includes at least some AC supplied brushless DC motors locked by electronic or other control to the AC supply for efficiency reasons.

AC driven synchronous motors are an efficient and well known method of powering machines requiring a constant speed drive, since the motor is locked to a rotational rate which is dependent on the driving frequency. Starting such motors is difficult since there is no unidirectional starting torque unless the motor speed is close to the synchronous speed in other words unless synchronous speed is low.

Typically this indicates the use of either a variable frequency power supply to allow starting the motor at low speed, the combination of the motor with another type of motor to supply the starting torque (such as an induction motor using at least partially the same windings), or the use of some mechanical device to provide initial movement and then to allow movement in only a single direction. Examples of the latter include various clutches and impulse starters although a feature common to many is a difficulty in determining a starting direction for the synchronous motor, which will lock equally well in either direction of rotation.

Some solutions are shown in U.S. Pat. No. 5,859,513 which uses a separate starting winding and U.S. Pat. No. 4,716,325 which uses a mechanical reverse direction protection. U.S. Pat. No. 3,529,221 shows a shaded pole motor with windings switched to start the motor, providing limited control of starting direction and torque. The performance of these motors is satisfactory only for a narrow range of undemanding applications, and construction is complex.

US patent application 2006/0071577 relates to a multipole motor in which there is a set of annular coils on either side of an annular rotor and the sets of coils are offset and separately driven so that the number of poles is effectively doubled. EP 1211787 relates to an AC motor driven by a switched DC supply derived from an AC supply such that the DC switching frequency is varied to maintain the motor at synchrony from start up speed to parity with the AC supply. EP 0991178 relates to a synchronous motor having two coils which are supplied alternately with a half cycle of one polarity of the AC supply, thereby providing a half normal synchronous speed. U.S. Pat. No. 3,529,221 relates to an AC motor having a tapped coil, part of which may act as a starting winding and the whole of which acts as the running winding. The coil parts are not separately energised at any time. U.S. Pat. No. 6,249,103 discloses a motor coil of two parts where one part is adapted to provide a higher torque than the other by using more current in dependence on the starting torque required. U.S. Pat. No. 4,695,782 relates to a motor whose rotor position is sensed by attached sensors which override the motor control if the motor moves in the incorrect direction. EP 0945973 relates to a triac driven motor with gated triac control of the start and a preferential starting position. DE 3609793 relates to a mechanical system detecting reverse rotation. JP 62171449 discloses a disk motor with electronic commutation and asymmetric windings and magnets to reduce cogging. U.S. Pat. No. 6,534,946 which relates to a motor in which reverse or forward direction is detected by an attached potentiometer or similar, but in which there is no control of torque. U.S. Pat. No. 6,249,103 relates to a motor with a tapped coil and a circuit which allows only part of the coil to operate for an initial period while starting before the whole coil is switched into circuit.

Other methods of providing motors which lock to the supply frequency involve the use of brushless DC motors which are typically multi-phase inverter driven machines with Hall effect sensors to detect the rotation of the machine rotor and a controller to bring the motor up to speed and lock the rotation to the mains supply. Such motors are costly to drive and control.

Therefore a need exists for a solution to the problem of providing a synchronous motor which will start without undue mechanical or electrical complexity and which will reach and maintain a rotational speed synchronous with an AC supply.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The term "motor phase" as used herein refers to the phase angle between the AC voltage applied to the motor and the back electro-motive force (EMF) produced by the motor. This value is normally closely equivalent to the phase relationship between rotor position and applied AC voltage for any one construction of a motor.

SUMMARY OF THE INVENTION

In one exemplification the invention consists in a method of starting and controlling an alternating current driven motor comprising a rotor with poles and a stator the stator having at least one energising coil per pole, by:

transiently supplying alternating current through at least one energising coil in a switched manner synchronously with the alternating current supply to the motor to start the motor in a rotational direction;

detecting when the rotational direction is incorrect and removing the alternating current supply and allowing the motor to stop;

otherwise controlling the connection of supply current to the coils by:

detecting when at least one of the energising coils could, if energised, supply an accelerating torque to the rotor;

connecting a supply current to that coil for at least part of the period during which it would provide rotational acceleration;

accelerating the rotor towards a synchronous rotational rate.

Preferably the invention includes maintaining the rotor at a synchronous rotational rate once accelerated.

Preferably the invention includes initially aligning the rotor by maintaining a supply current applied to a coil or combination of coils until the rotor is aligned with the magnetic field created.

Preferably the invention includes starting the motor in a random direction by transiently providing a supply current to a coil or coil combination.

Preferably the invention includes connecting the alternating current supply to a coil or coil combination for at least part of the period when both the coil reverse EMF and the applied voltage are in phase.

Preferably the step of detecting when a coil or coils could supply an accelerating torque to the rotor includes detecting the back EMF on at least one coil or combination of coils, detecting the AC voltage applied to the motor, detecting when the applied voltage is of the same polarity as the back EMF.

Preferably the step of accelerating the rotor towards a synchronous rate includes connecting the AC voltage to the coil or combination of coils when the back EMF and applied AC voltage are of the same polarity.

Preferably the switching means is a triac, and the triac gate voltage is monitored to determine when the triac is non-conducting, and a value representative of the back EMF derived from the voltage across the triac when the triac is non-conducting.

Preferably at synchronous speed the rotor accelerating torque is maintained at the minimum value which will retain synchronism.

An alternating current driven synchronous motor control circuit comprising:

a switching means supplying alternating current to at least one coil or combination of coils in a motor with a rotor having multiple poles and a stator having at least one energising coil per pole, a detection means detecting when the back EMF on a coil or combination of coils is of the same polarity as the applied voltage, and an activating means activating the switching means for at least part of the period detected by the detecting means.

Preferably the switching means separately switches at least two adjacent coils.

Preferably the adjacent coils are constituted by a pole coil with a tapping point.

Preferably the circuit switching means has a control electrode and the circuit compares the back EMF as measured across the switching means when a measurement at the control electrode of a switching means indicates that the switch is not conducting.

These and other features of as well as advantages which characterise the present invention will be apparent upon reading of the following detailed description and review of the associated drawings.

DESCRIPTION OF THE INVENTION

Figure 1:
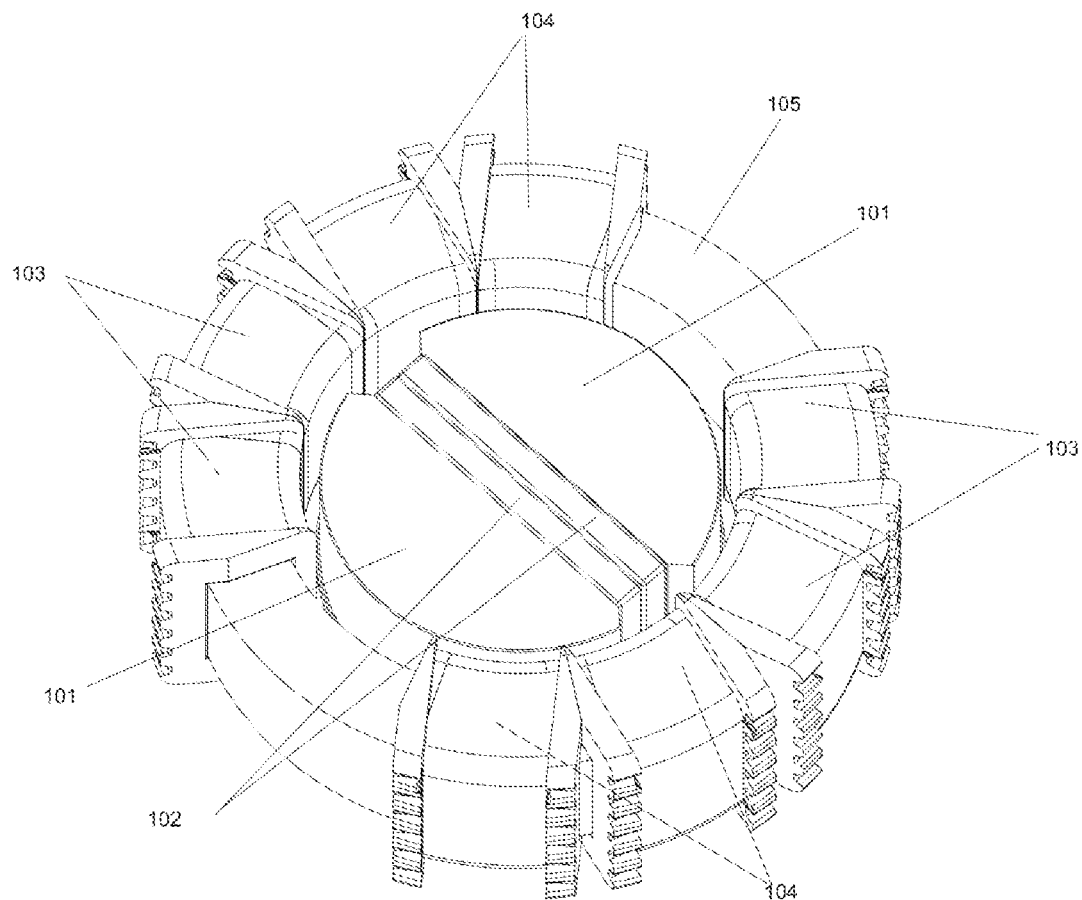
FIG. 1 is a general perspective view of a motor layout.

Referring now to FIG. 1 a synchronous motor consists generally of a rotor with pole pieces 101 and magnets 102, the axle shaft and driven connection of the rotor not being shown.

Stator 102 consists of a back iron 105, which is a toric magnetic element such as laminated steel; and wire wound bobbins 103, 104 where the bobbins form a winding on each pole of the motor, the bobbins forming a first winding of bobbin 103 and a second winding of bobbins 104, and the windings in total do not subtend the full circumference of the stator. The windings on the bobbins on each side consist typically of a single wire continuously wound along all four bobbins, but extending to a tap point located in the grooves on the bobbin cheek. There may be a tap point between each pair of bobbins or only one tap point may be present located between bobbins 103, 104. Typically the windings on each pole of a single phase machine may subtend from 120 to 135 degrees.

A single phase AC supply is connected to the bobbins on each side of the motor and the current through the different parts of the winding is phase controlled to provide a unidirectional torque while the motor is below synchronous speed. This requires detection of the speed of the rotor versus the AC supply frequency, and control of the current in a part of the winding in dependence on the speed difference from synchronous speed. Many possible connections of the windings may be used to provide the required control.

Figure 2:
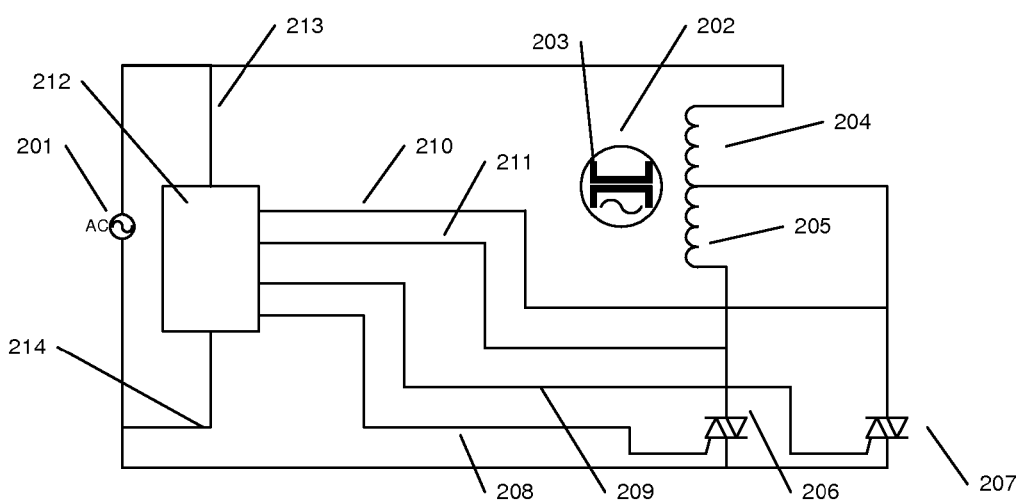
FIG. 2 is a block diagram of a circuit for use with the motor of FIG. 1.

A circuit such as that shown in FIG. 2 may be used where a source of alternating current 201 is connected to windings 204 and 205, representing windings 103 and 104 where all windings 103 are typically in series and all windings 104 in series. The winding tap between 204 and 205 is connected to triac 207 and the end connection of the windings is connected to triac 206.

A microprocessor control 212, supplied with and measuring the applied AC voltage via 213, 214 controls the firing angle of the triacs under software control in a known manner, based on the phase of the AC voltage, the voltage, at the tapping point via connection 210, the voltage at the end point via connection 211 and the voltage, at the gate of each triac via connections 208, 209.

Connections 210, 211 monitor the voltage across the triacs when these are turned on, and the EMF of the motor when the triacs are off. The detection of the back EMF allows a measure of whether the rotor is rotating in response to the applied voltage, what the speed of rotation is, and what the rotor position is with respect to the windings. Optionally the back EMF may be measured when the gate voltage of the triacs indicates that the triac is off.

Using this information it is possible to firstly align a non-rotating rotor to a known position (normally by lightly energising both windings to centralise the rotor between them), then to energise one half of the winding to begin the initial rotor rotation in the desired direction, then to advance the rotor by controlling the cyclic energisation of the coils to maintain a rotating field ahead of the rotor until the rotor is at synchronous speed.

A normal synchronous motor can be loaded until the rotor lags the rotating field by up to 90 degrees, at which point it is providing maximum torque. Any attempt to increase loading past that point will result in the motor dropping out of synchronism and stopping. Using the controlled fields of the two windings it is possible to exceed 90 degrees of lag, since sensing the back EMF allows the detection of the rotor lag and control of the individual windings to maintain the rotor-sensibly synchronous at lag factors over 90 degrees.

Figure 3:
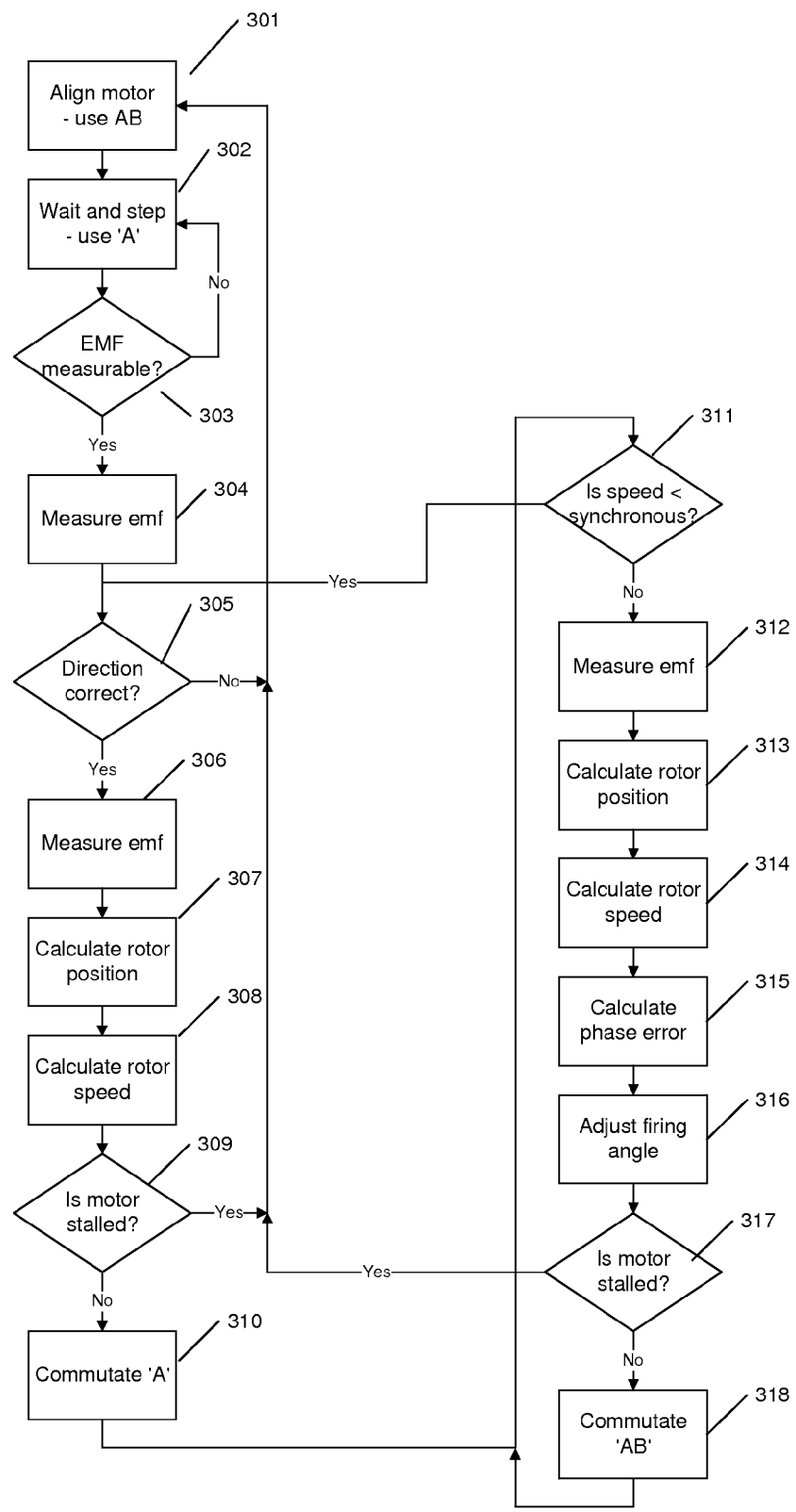
FIG. 3 is a flow diagram suitable for the circuit drive of FIG. 2.

FIG. 3 shows the flow diagram of the microcontroller which consists essentially of three operating areas concerned with (a) starting the motor rotating in the correct direction; (b) bringing the motor up to synchronous speed; (c) maintaining the motor in synchronism under varying loads.

When, initially switched on the motor may be aligned in any position and on coil energising may rotate in either direction. To ensure that only rotation, in the correct direction is allowed the procedure starting at step 301 is followed. This procedure differs from one requiring initial alignment to a static position and instead randomly enrgises the system in one direction. This uses a process which consists of energising the coils 204 and 205 (respectively. B and A in, the flow diagram and drawings with AB as the series combination), thus providing a higher alignment current than coil 205 in FIG. 2 can supply alone. Only a short periodic energisation is provided at step 302, and the resultant reverse EMF across coil 205 (B) is measured at 303, 304 to determine the direction of energisation.

Figure 4:
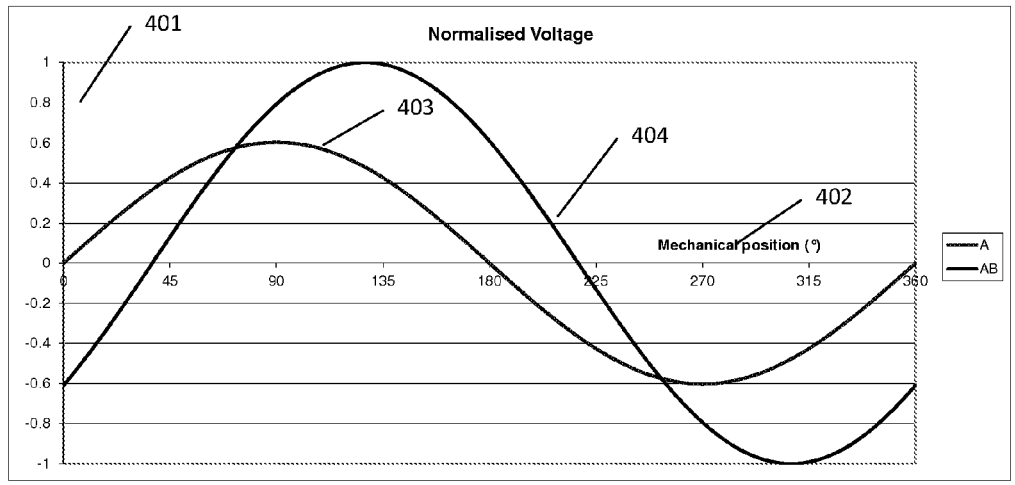
FIG. 4 shows a comparison of winding back EMF for direction determination.

FIG. 4 shows how this measurement is carried out where with an initial impetus having been supplied to the motor, the relative normalised back EMF 401 across A is shown at 403 and across the combination AB at 404. If the phase of voltage 403 is leading that of 404 then the motor is rotating one way. If it is lagging then the motor is rotating the other way.

It may require a few cycles of applied current to rotate the rotor at a speed sufficient to allow detection of the back EMF but once this is measurable it is possible to determine whether it leads or lags and hence to determine the rotation direction at 305. If the direction is not correct the program loops back to 301 and again applies an energising voltage essentially at random after a short wait. This process will eventually result in the motor starting in the correct direction.

At this point the procedure starting with step 306 is carried out in which the EMF across the B coil is again measured at 306, the rotor position calculated at 307 from the difference in phase between the applied and detected voltages and the rotor speed calculated at 308 from the difference in position of the rotor on successive cycles of applied voltage. At 309 the detection of no change in position and zero speed indicates that the motor has stalled, so the whole procedure is restarted from 301, otherwise if the speed is found at 311 to be below synchronous speed the procedure using the A coil is re-entered at 305.

Figure 5:
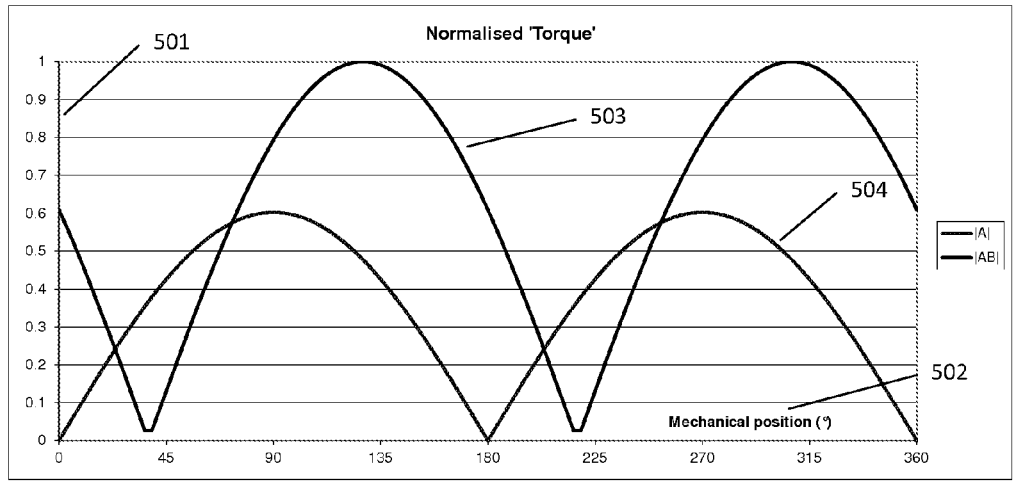
FIG. 5 shows the torque developed by the windings.

FIG. 5 shows how the motor; unlike a normal synchronous motor, generates a continuous torque from even a slow speed. The figure shows the normalised torque at 501 plotted against the mechanical rotation of the motor for the torque contributions of the A winding at 504 and the AB series winding at 503. While the torque for each winding goes through two zero points per rotation the combination produces appreciable torque throughout the rotation, meaning that the motor can carry a load from close to zero rotational speed.

Eventually the rotor will reach synchronous speed and switch to the procedure starting at 312 in which again the rotor position and speed are calculated from the reverse EMF, which may be taken across either coil B or across the series combination of A+B when no voltage is applied. From the rotor position it can be determined how far the rotor is out of phase with the desired rotor position at synchronism. This phase error is corrected by varying the firing angle of the voltage applied to the coils in such a manner as to increase or decrease the applied torque and so bring the rotor back to the desired position.

In this manner the motor may be set at a selected output speed and maintained at that speed regardless of whether it is actually synchronised with the applied AC. Further, the phase lead or lag can be controlled in at least some degree to provide the greatest possible efficiency.

At rotor speeds below synchronism the rotor is most easily controlled by a triac or similarly triggered switching device when the number of ac cycles per rotation of the rotor is an integral number divided by the number of poles, since the triac can then be triggered at the same point in the rotation of the rotor on each successive set of cycles. The rotor speeds around which control is most easily obtained are therefore ⅕, ¼, ⅓, ⅖, ½, ⅔ etc of the full synchronous speed. The microprocessor may be arranged to step up through such a sequence to bring the rotor to full synchronous speed.

Figure 6:
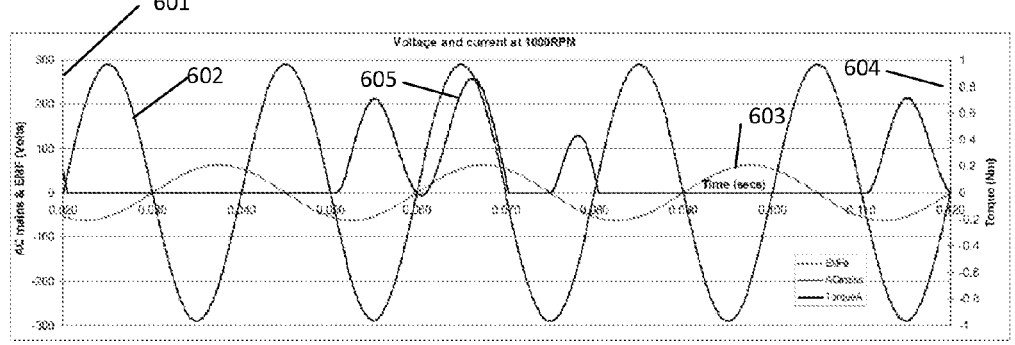
FIG. 6 shows control of the motor current at low speed.

FIG. 6 shows the torque generated at a speed well below synchronism and shows the applied voltage 602 measured at 601, the back EMF across winding A at 603 and the torque 605 measured at 604 generated by switching on the current through winding A. The processor controlling triacs 206, 207 will switch the appropriate one on when a torque in the correct direction can be obtained, given the instant applied voltage and the instant back EMF. Thus whenever the applied voltage and the back EMF are of the same polarity the triac to the relevant, coil could usefully be switched on, although since zero crossing switching is used the actual switch on time will be lower than the theoretical maximum.

Figure 7:
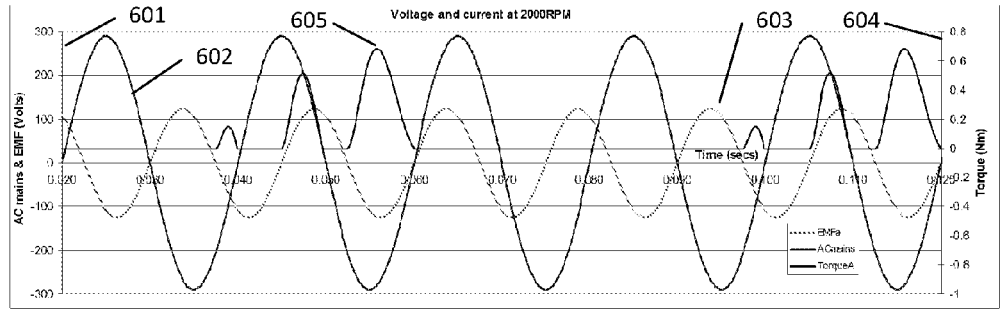
FIG. 7 shows control of the motor current at higher speed.

FIG. 7 shows the same readings as in FIG. 6 but for double the motor rotational speed, at 2000 RPM. It is notable that the opportunities to generate torque are reduced as the applied AC and the back EMF remain out of phase for comparatively longer. This will therefore result in a reduction of torque compared to the start-up torque as the motor speeds up.

Figure 8:
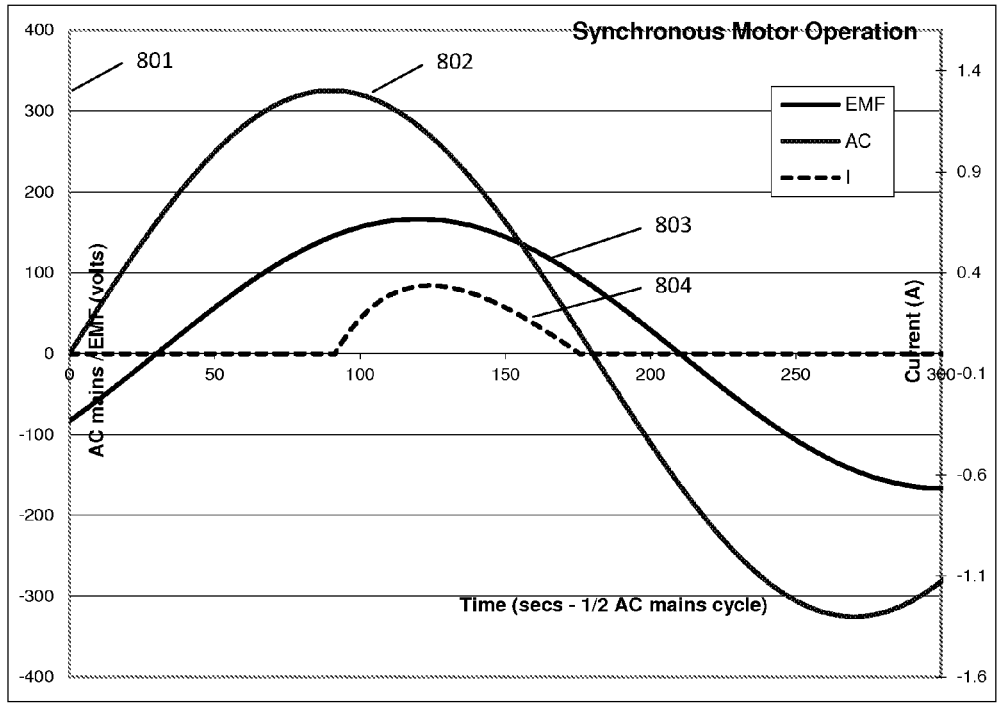
FIG. 8 shows the circuit current and voltages at synchronism.

FIG. 8 shows typical waveforms at synchrony where the AC supply measured at 801 and shown at 802 is applied to the motor and produces a back EMF 803 through windings AB which lags the applied voltage, as opposed to the standard synchronous motor where the back EMF leads the applied voltage. The current through the triac is now controlled, by controlling the firing time, to provide the torque required to maintain the motor in synchronism, since it is possible to operate the motor above synchronous speed. A valuable feature of operation is that the motor may be maintained in a mode in which the minimum power is taken from the supply line to maintain the motor in synchronism with the AC supply. In comparison with a typical synchronous motor which will provide maximum torque and efficiency at 90 degrees phase lag with the applied voltage, and drop out of synchronism to require restarting if the load is increased, the inventive motor will merely require controlling back up to synchronous speed on a load increase and can be maintained at any required phase lead or lag for efficiency. The waveform shows the motor with a leading phase angle.

Figure 9:
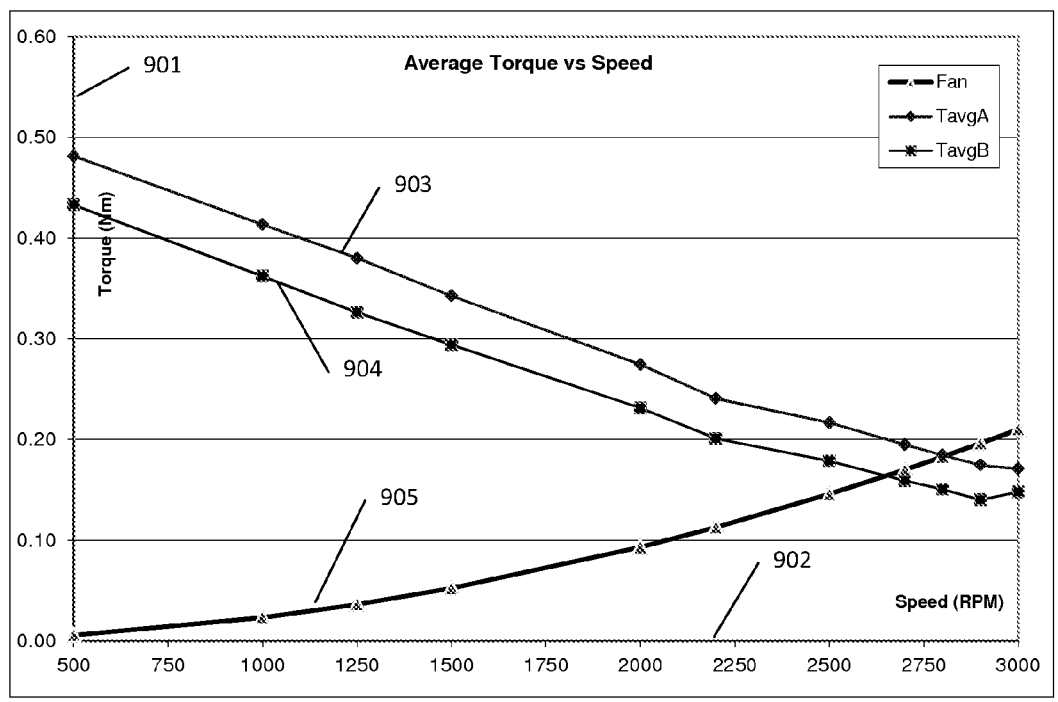
FIG. 9 shows a graph of supply torque versus load torque.

FIG. 9 shows a typical variation of motor torque versus load torque for a typical load of a fan. At 901 the torque in Newton meters is shown for winding A at 903 and winding B at 904, showing that both reduce with increasing rotational speed 902. The torque absorbed by the load fan is shown at 405, with a balance between applied torque and absorbed torque eventually providing a stable operating speed.

While the motor shown is a two pole motor the technique is applicable to multi-pole motors, requiring only a controller with more switching devices for the increased number of taps. It is not necessary that all windings be controlled, since depending on the application only a single part of a coil on a single pole or pair of poles may need to be set as a starting winding where the starting torque is very low.

While the description refers to a stator carrying controlled coils the construction is equally applicable to a rotor carrying the control circuitry and the controlled coils.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements such as the number of poles of the motor may vary dependent on the particular application for which it is used without variation in the spirit and scope of the present invention.

In addition, although the preferred embodiments described herein are directed to alternating current synchronous motors for use in systems such as low power fluid pumps, it will be appreciated by those skilled in the art that the teachings of the present invention can be applied to other systems such as industrial fan motors, without departing from the scope and spirit of the present invention.

INDUSTRIAL APPLICABILITY

The motor of the invention is used in the electrical industry and are typically employed it the domestic white ware industry for instance as fluid pumps or fan motors. The present invention is therefore industrially applicable.

What is claimed is:

1. A method of starting and controlling a single phase alternating current driven motor capable of synchronous operation comprising a rotor with poles and a stator the stator having at least one energising coil winding per pole, by:
   supplying switched sinusoidal single phase alternating current from an alternating current supply through at least one part of a pole energising coil winding separate from the remainder of that pole energising coil winding in a switched manner synchronously with the alternating current supply to the motor to start the motor in a rotational direction;
   detecting when the rotational direction is incorrect and removing the alternating current supply and allowing the motor to stop;
   continuously determining the required rotor position relative to a desired rotor position;
   controlling the connection of supply current to the pole energising coils or pole energising coil parts by:
   detecting when at least one of the pole energising coils or coil parts could, if energised, supply an accelerating torque to the rotor to bring the rotor towards the desired position;
   accelerating the rotor towards a desired rotor position or maintaining the motor at a desired rotor position corresponding to a selected rotational rate by connecting a supply current from the alternating current supply to that pole energising coil or coil part which can provide an accelerating torque and connecting that supply current for at least part of the period during which it could provide an accelerating torque accelerating the rotor towards a synchronous rotation rate;
   wherein the torque of the motor is controlled by controlling the switched alternating current supply to each pole energising winding part separated from the remainder of each pole energising coil winding and to the complete pole energising winding such that the part provides a torque at a rotor position differing from that of the complete pole energising coil winding.

2. A method as claimed in claim 1 wherein the different parts of a pole energising coil provide back EMF at differing phase angles when the rotor is rotating.

3. A method as claimed in claim 1 including initially aligning the rotor by maintaining a supply current applied to a pole energising coil or coil parts until the rotor is aligned with the magnetic field created.

4. A method as claimed in claim 1 including connecting the alternating current supply to a pole energising coil or coil combination for at least part of the period when both the coil reverse EMF and the voltage of the alternating supply current are in phase, the part of the period being dependent on the motor speed, the desired motor speed, the rotor position and the desired rotor position.

5. A method as claimed in claim 1 wherein the step of detecting when a coil or coils could supply an accelerating torque to the rotor includes detecting the back EMF on at least one pole energising coil or combination of coils, detecting the voltage of the alternating supply current applied to the motor and detecting when the voltage of the alternating supply current is of the same polarity as the back EMF.

6. A method as claimed in claim 1 wherein the alternating supply current is applied in a switched manner through a switching means which switching means is a triac, and the triac gate voltage is monitored to determine when the triac is non-conducting, and a value representative of the back EMF derived from the voltage across the triac when the triac is non-conducting is taken from the triac gate.

7. A method as claimed in claim 1 wherein when the motor speed is at synchronous speed relative to the alternating supply current the rotor acceleration is maintained at the minimum value which will retain synchronism.

8. A method as claimed in claim 1 wherein the energising coil winding parts are separated by being on differing bobbins of the same energising coil winding.

9. A single phase alternating current synchronous motor control for a motor with a stator having at least one pole having an energising coil winding consisting of at least two separated coil winding parts, the single phase alternating current synchronous motor control comprising:
   a controlled switch for the energising coil winding and a controlled switch for at least one coil winding part of that coil winding; and
   a controller configured to:
   determine the rotor position from the motor and control operating voltages and currents, and
   determine the difference in the rotor position from the desired rotor position and controlling the cyclic energisation of the coil winding or coil winding parts by the controlled switches with sinusoidal single phase alternating current to supply a torque to the rotor to bring the rotor towards a desired position, characterised in the current through the each controlled switch of an energising coil winding being capable of producing a torque differing with at least rotor position from that of a controlled switch for a separated coil winding part.

10. A single phase alternating current synchronous motor control as claimed in claim 9 wherein the controlled switches separately switch at least two adjacent coils.

11. A single phase alternating current synchronous motor control as claimed in claim 9 wherein the controlled switches have a control connection and the controller compares the back EMF as measured across the controlled switches when a measurement at the control connection of one of a controlled switch indicates that the controlled switch is not conducting.

* * * * *